United States Patent
Woods

[19]

[11] Patent Number: 6,125,511
[45] Date of Patent: Oct. 3, 2000

[54] HANDLE PIECE FOR A COCK

[75] Inventor: Shane Alan Woods, Doonside, Australia

[73] Assignee: Taptek Pty Ltd., Australia

[21] Appl. No.: 09/202,402

[22] PCT Filed: Apr. 14, 1997

[86] PCT No.: PCT/AU97/00234

§ 371 Date: May 3, 1999

§ 102(e) Date: May 3, 1999

[87] PCT Pub. No.: WO98/01693

PCT Pub. Date: Jan. 15, 1998

[30] Foreign Application Priority Data

Jul. 3, 1996 [AU] Australia ................ PO 0811

[51] Int. Cl.[7] ................................................ A47B 95/02
[52] U.S. Cl. .......................... 16/422; 16/441; 16/DIG. 12
[58] Field of Search ............................ 16/422, 441, 431, 16/433, 435, 413, 904, 110.1, DIG. 12, DIG. 19, DIG. 41; 251/105–108; 74/557, 551.9, 553

[56] References Cited

U.S. PATENT DOCUMENTS

| 4,397,489 | 8/1983 | Lind ........................................ 16/413 |
| 4,766,642 | 8/1988 | Gaffney et al. ........................... 16/441 |
| 4,783,885 | 11/1988 | Bory ........................................ 16/422 |
| 4,835,816 | 6/1989 | Graef ....................................... 16/422 |

FOREIGN PATENT DOCUMENTS

| 61168/80 | 8/1980 | Australia . |
| 99046 | 12/1987 | Australia . |
| 123310 | 8/1994 | Australia . |
| 0001632 | 5/1979 | European Pat. Off. . |
| 3426050 | 1/1986 | Germany . |
| 390272 | 4/1933 | United Kingdom ............ 16/422 |

OTHER PUBLICATIONS

Selby Products for Independent Living, catalogue. Selby Scientific, (undated) "Eastiturn" Tap Turner, p. 9.

*Primary Examiner*—Chuck Y. Mah
*Attorney, Agent, or Firm*—Paul & Paul

[57] ABSTRACT

A handle piece (15) for application to the cross bar handle (14) of a domestic hose cock comprises a unitary plastics moulding comprising an open bottomed shell (16) having an upper surface sized to fit into the palm of the hand. Formations within the shell define a recess adapted to receive the cross bar handle and comprise opposed pressure pads (19, 20) at or near each end of the recess adapted to bear against respective end portions of a cross bar handle when homed in said recess. Two opposed resilient flanges (22) resiliently clasp the cross bar handle intermediate its ends to retain the handle piece in position upon and shrouding the cross bar handle.

6 Claims, 2 Drawing Sheets

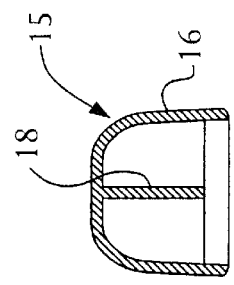
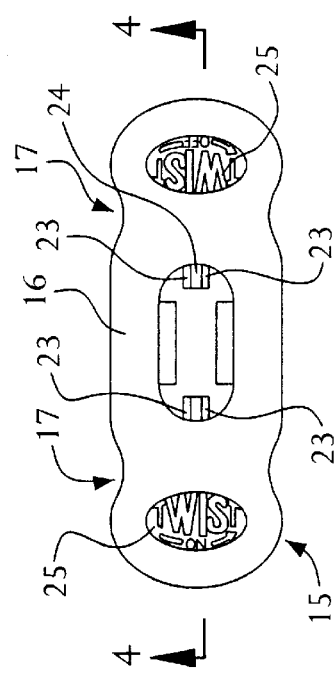
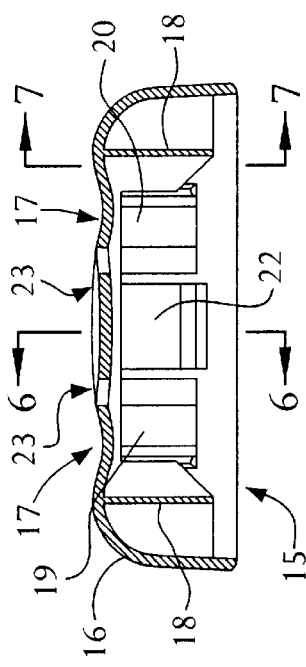
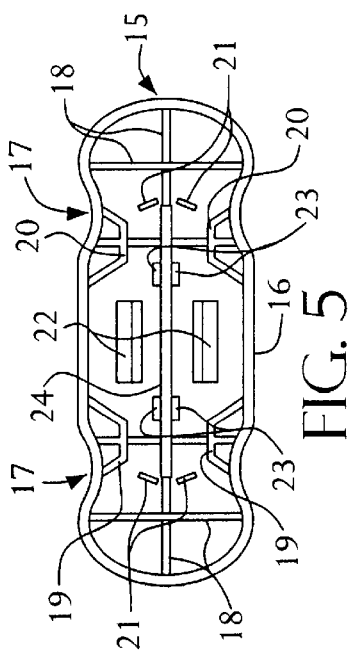
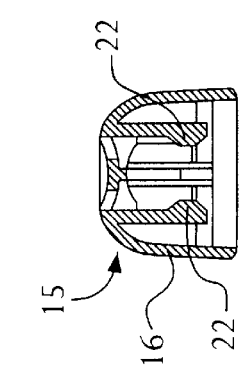

HANDLE PIECE FOR A COCK

TECHNICAL FIELD

This invention relates to cocks or valves of the kind useable, for example, to control the flow of water along or from a mains domestic water supply pipe. When the valve is used to allow water to flow from the pipe for use, usually through a spout comprising a part of the valve, it is customarily called a domestic tap. Such taps are frequently used to control flow into a garden hose, in which event the end of the spout is customarily enlarged and externally threaded to receive a hose connector. For descriptive convenience all such domestic cocks, valves and taps are referred to hereinafter as domestic cocks.

BACKGROUND ART

Hitherto, domestic cocks have usually comprised a valve body defining a fluid inlet and a fluid outlet, and a valve spindle projecting from the body. The free end of the projecting part of the valve spindle is furnished with a handle whereby the spindle may be rotated to open and close the cock. The spindle commonly has an externally threaded portion in engagement with an internally threaded bore in the valve body. Rotation of the spindle causes it to advance and effect pressure contact between a valve element, which is loosely engaged by the inner end of the spindle, and a valve seat encircling the flow path through the valve body, so as to close the cock. Likewise the spindle may be rotated in the opposite sense to allow the valve element to separate from the seat and allow water to flow through the cock.

Although the handle may take other forms, in domestic hose cocks and like domestic taps it is almost invariably a short cross-bar extending perpendicularly of the spindle axis. As a result, it sometimes happens that the very young, the very old, or other persons with physical deficiencies or deformities affecting the hands, are unable to obtain sufficient purchase on the handle to open a tightly closed domestic cock. Such persons may have to resort to a wrench or spanner if such be available; but even if it is available the use of such an implement may be beyond the capability of the physically handicapped.

It is known to provide ornamental additions to domestic hose cock handles, for example cast metal bird shapes or the like, which are recessed to enable loose engagement with a conventional cross-bar handle. Being larger than the conventional handle, these may offer some assistance to some of the handicapped, however they are not firmly attached to the handle, and their tendency to wobble on the handle and the fact that they are not shaped to facilitate them being grasped, renders them of limited help at the best.

DISCLOSURE OF INVENTION

Therefore, an object of the present invention, is to provide a handle piece for attachment to a conventional cross bar handle of a domestic cock which meets the following desiderata:

(a) it is easily applied to the handle, (b) having been applied it is stably engaged with the handle, (c) it is inexpensive, (d) it is sized and shaped to fit into the palm of the hand and to be grasped therein, and (e) it is strong enough to allow a substantial torque to be applied to the handle in either direction.

The invention consists in a handle piece comprising a unitary plastics moulding comprising a generally rectangular prismatic, open bottomed shell having an upper surface sized to fit into the palm of the hand, formations within the shell defining a recess adapted to receive a cross bar handle of a domestic water cock and comprising opposed pressure pads at or near each end of the recess adapted to bear against respective end portions of the cross bar handle when homed in said recess, and at least one pair of opposed resilient flanges adapted to clasp the cross bar handle intermediate its ends when the cross bar handle is homed in the recess as aforesaid, whereby the handle piece is retained in position upon and shrouding the cross bar handle.

In preferred embodiments the ends of the recess are defined by resilient lugs or fingers to enable the recess to accommodate cross bar handles of slightly differing lengths.

In preferred embodiments the corners and edges of the upper surface of the shell are smoothly rounded to render the handle piece as a whole more comfortable when grasped by the hand.

BRIEF DESCRIPTION OF THE DRAWINGS

By way of example an embodiment of the above described invention is described in more detail hereinafter with reference to the accompanying drawings.

FIG. 3 is a plan view of the handle piece of FIG. 2.

FIG. 4 is a sectional elevation taken on line 4—4 of FIG. 3.

FIG. 5 is a view from below of the handle piece of FIG. 3.

FIG. 6 is a sectional view taken on line 6—6 of FIG. 4.

FIG. 7 is a sectional view taken on line 7—7 of FIG. 4.

BEST MODE OF CARRYING OUT THE INVENTION.

Figure 1:
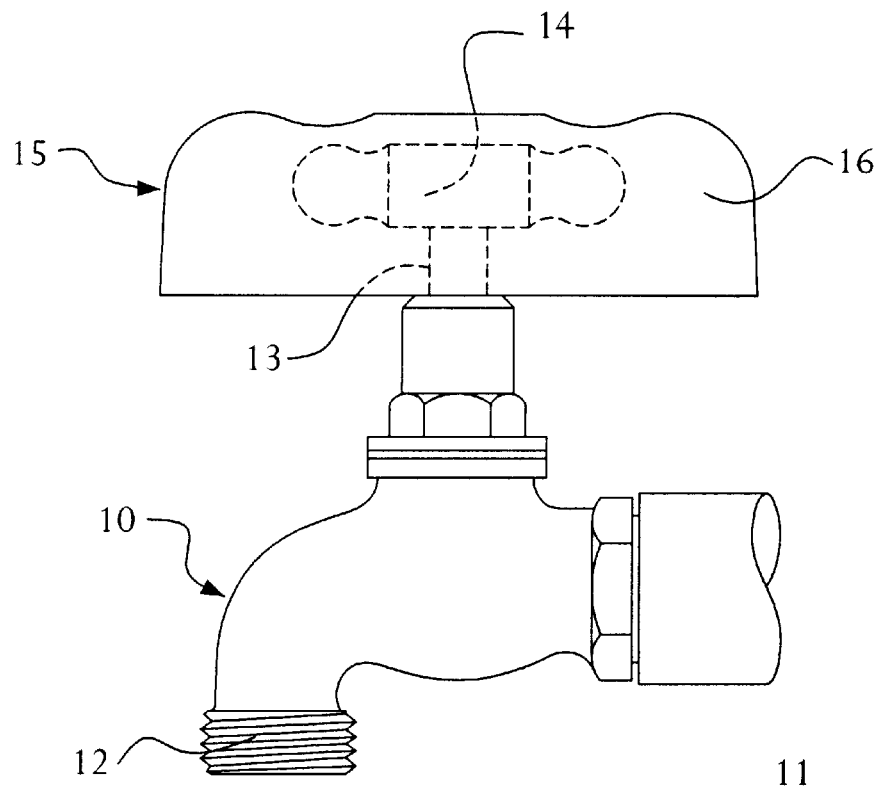
FIG. 1 is a side elevation of a domestic hose cock to which a handle piece according to the invention has been applied.
Figure 2:
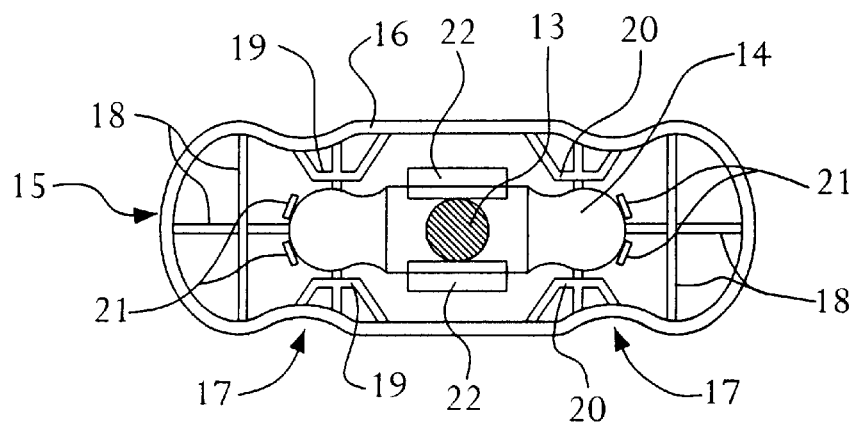
FIG. 2 is a view from below of the under surface of the handle piece appearing in FIG. 1.

Referring initially to FIGS. 1 and 2, there is illustrated a conventional domestic hose cock 10 for controlling the outflow of water from a supply pipe 11 through the cock's spout 12. The cock 10 further comprises a spindle 13 and a cross bar handle 14.

The hose cock of FIG. 1 is furnished with a handle piece 15 as more fully illustrated in the remaining figures. That handle piece is a unitary plastics moulding comprising a generally rectangular prismatic, open bottomed shell 16 of a size such that it may be grasped while fitting into the palm of the hand. Although of a generally rectangular prismatic shape, the ends and upper longitudinal corners of the shell 16 are smoothly rounded, as shown in the drawings, to make it more comfortable to grip. Furthermore it may be waisted slightly at 17 near each end so that it presents an external appearance approximating that of an enlarged cross bar handle.

The shell 16 is furnished with internal strengthening ribs 18 and, more importantly, with internal formations defining a recess adapted to receive the cross bar 14 handle of a domestic water cock, and comprising pairs of opposed pressure pads 19 and 20 at or near each end of the recess adapted to bear against respective end portions of the cross bar handle 14 when homed in said recess. In this instance, the internal means defining the recess, further comprise resilient lugs or fingers 21 adapted to bear against the opposite ends of the handle 14.

The shell 16 is also furnished with at least one pair of opposed resilient flanges 22 adapted to clasp the cross bar handle 14 at a position intermediate its ends when the cross bar handle is homed in the recess as aforesaid, whereby the handle piece is retained in position upon and shrouding the cross bar handle. As best seen in FIG. 6 those flanges are shaped to be sprung apart by the handle 14 on its insertion into the handle piece and include free end ribs which come together to a spacing less than the diameter of the handle. Preferably the ribs come into firm contact with the spindle 13. Thus the handle 14 is positively clasped and the handle piece cannot be removed except by a force sufficient to spring the flanges 22 apart to allow the passage of the handle between the flange ribs.

In the present instance the pressure pads 19 and 20 are relatively small abutments projecting from the shell 16, but in other embodiments the recess for the handle 14 is more fully defined by a wall conforming substantially to the periphery of the handle 14 and the so called pressure pads may be no more than appropriate portions of that wall distinguished from the remainder of the wall only by their functional pressure contact with the cross bar handle.

For preference the shell 16 is pierced by pairs of holes 23, with the holes of each pair disposed on opposite sides of a spinal rib 24. This enables a ratcheted tie strap to be passed around the rib 24 and the bar handle 14 and tightened up to guard against pilfering of the handle piece if applied to a garden tap within reach of unscrupulous passers-by.

For preference the shell has indicia 25 indented or raised from its surface indicating the respective directions in which the handle piece gas to be turned to open and close the cock.

For preference a plastics or other snap on cap may be provided to engage the holes 23 and finish off the handle piece in a cosmetic sense.

What is claimed is:

1. A handle piece comprising a unitary plastics moulding comprising a generally rectangular prismatic, open bottomed shell having an upper surface sized to fit into the palm of the hand, formations within the shell defining a recess adapted to receive a cross bar handle of a domestic water cock and comprising opposed pressure pads at or near each end of the recess adapted to bear against respective end portions of the cross bar handle when homed in said recess, and at least one pair of opposed resilient flanges adapted to clasp the cross bar handle intermediate its ends when the cross bar handle is homed in the recess as aforesaid, whereby the handle piece is retained in position upon and shrouding the cross bar handle.

2. A handle piece according to claim 1 wherein the formations defining the recess further comprise resilient lugs adapted to contact the respective ends of the cross bar handle.

3. A handle piece according to claim 1 wherein said flanges have tips that are spaced apart by a distance less than the diameter of the cross bar handle.

4. A handle piece according to claim 1 wherein the ends and corner edges of the shell are smoothly rounded.

5. A handle piece according to claim 4 wherein the shell is waisted near each end to simulate the shape of an enlarged cross bar handle.

6. A handle piece according to claim 1 wherein the shell is pierced by at least one pair of holes to enable an anti-pilfering strap to be passed through the holes and around the cross bar handle of a domestic cock.

* * * * *